United States Patent
Li

(10) Patent No.: US 10,333,772 B2
(45) Date of Patent: Jun. 25, 2019

(54) REMOTE KEYBOARD-VIDEO-MOUSE TECHNOLOGIES

(71) Applicant: Quanta Computer Inc., Taoyuan (TW)

(72) Inventor: Yung-Fu Li, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 245 days.

(21) Appl. No.: 15/175,922

(22) Filed: Jun. 7, 2016

(65) Prior Publication Data
US 2017/0353347 A1    Dec. 7, 2017

(51) Int. Cl.
*G06F 13/00* (2006.01)
*H04L 12/24* (2006.01)
(Continued)

(52) U.S. Cl.
CPC .......... *H04L 41/0654* (2013.01); *G06F 3/023* (2013.01); *G06F 3/14* (2013.01);
(Continued)

(58) Field of Classification Search
CPC .......... G06F 9/4416; G06F 3/14; G06F 3/023; G06F 11/20; G06F 13/00; G06F 15/177;
(Continued)

(56) References Cited

U.S. PATENT DOCUMENTS

| | | | |
|---|---|---|---|
| 2004/0073637 A1* | 4/2004 | Larson | H04L 12/4641 709/222 |
| 2004/0221151 A1* | 11/2004 | Kajita | G06F 13/385 713/2 |

(Continued)

FOREIGN PATENT DOCUMENTS

| | | |
|---|---|---|
| TW | I378352 B | 1/2000 |
| TW | I463327 B | 11/2001 |

OTHER PUBLICATIONS

Extended European Search Report for EP Application No. 17170590.8, dated Sep. 5, 2017.
(Continued)

*Primary Examiner* — Robert B Harrell
(74) *Attorney, Agent, or Firm* — Nixon Peabody LLP; Zhou Lu

(57) ABSTRACT

Technologies for remote keyboard-video-mouse sessions can include failover mechanisms. In some embodiments, a system can establish a first remote keyboard-video-mouse session between a console application on the system and a first server application executed by a controller on a server. The first remote keyboard-video-mouse session can be established via a first network connection between the system and the controller. Next, the system can detect an error associated with the first remote keyboard-video-mouse session. In response to the error, the system can establish a second remote keyboard-video-mouse session between the console application and a second server application executed by an operating or a basic input/output program on the server. The second remote keyboard-video-mouse session can be established via a second network connection between the system and the second server application.

18 Claims, 6 Drawing Sheets

(51) Int. Cl.
*H04L 29/08* (2006.01)
*H04L 29/06* (2006.01)
*G06F 3/023* (2006.01)
*G06F 11/20* (2006.01)
*G06F 3/14* (2006.01)

(52) U.S. Cl.
CPC ............ *G06F 11/20* (2013.01); *H04L 67/141* (2013.01); *H04L 67/42* (2013.01); *H04L 69/14* (2013.01); *G09G 2370/24* (2013.01); *H04L 67/025* (2013.01)

(58) Field of Classification Search
CPC ............... H04L 29/06; H04L 29/08072; H04L 29/08981; H04L 41/12; H04L 41/22; H04L 41/0213; H04L 41/0806; H04L 12/28; H04L 12/46; H04L 12/56; H04L 12/66; H04L 12/4641; H04L 29/06027; H04L 41/0654; H04L 45/00; H04L 47/10; H04L 49/351; H04L 49/354; H04L 67/025; H04L 67/42; H04L 67/141; H04L 69/14; G09G 2370/24

USPC .................................. 709/222, 223; 370/401
See application file for complete search history.

(56) References Cited

U.S. PATENT DOCUMENTS

| | | |
|---|---|---|
| 2006/0259612 A1 | 11/2006 | De Oliveira et al. |
| 2008/0313319 A1* | 12/2008 | Geffin ................. H04L 43/0817 709/223 |
| 2009/0055157 A1 | 2/2009 | Softer |
| 2009/0182799 A1* | 7/2009 | Huang .................... H04L 41/00 709/201 |

OTHER PUBLICATIONS

Taiwanese Office Action for Application No. 105125798, dated Sep. 11, 2017, w/ First Office Action Summary.

* cited by examiner

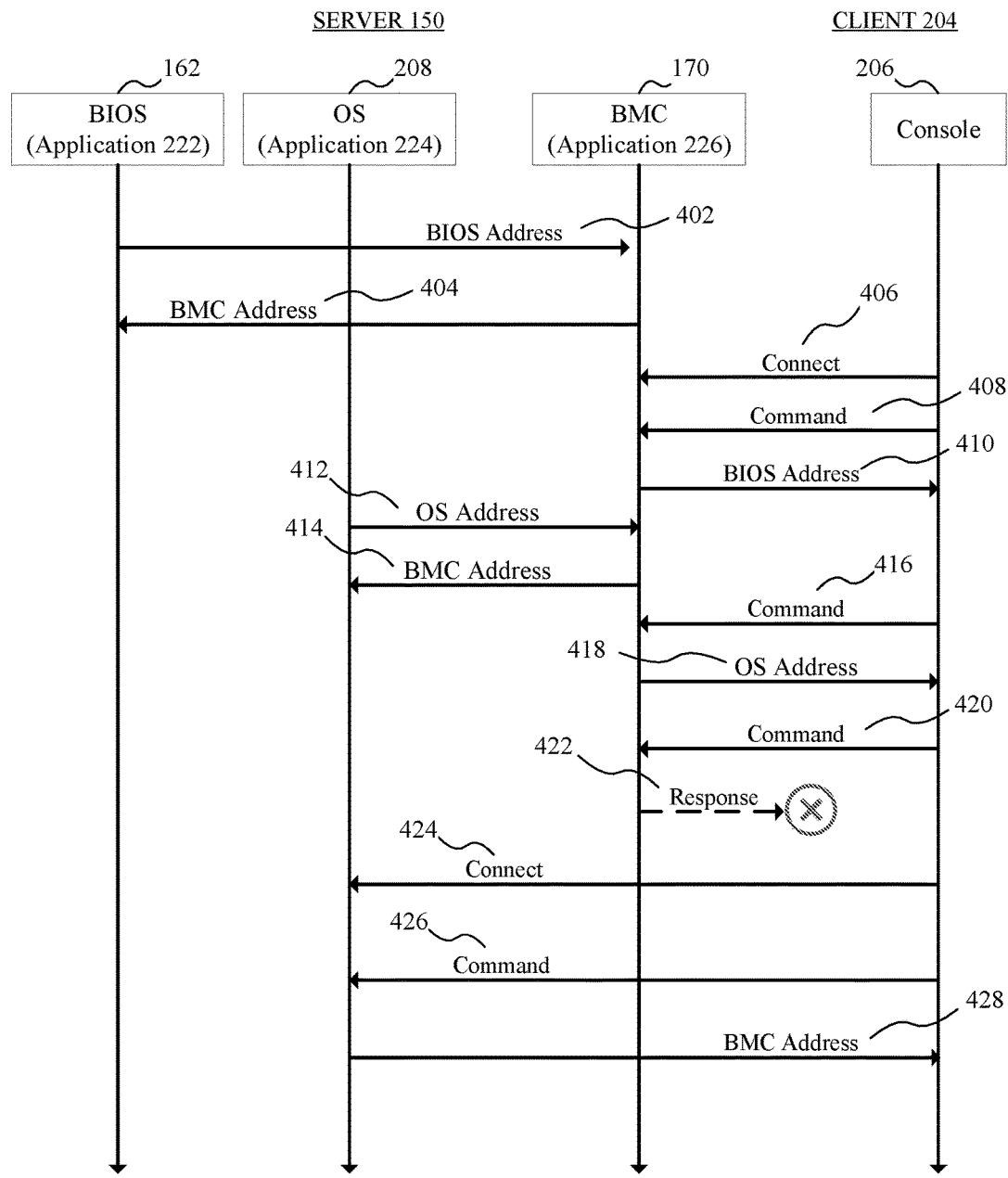

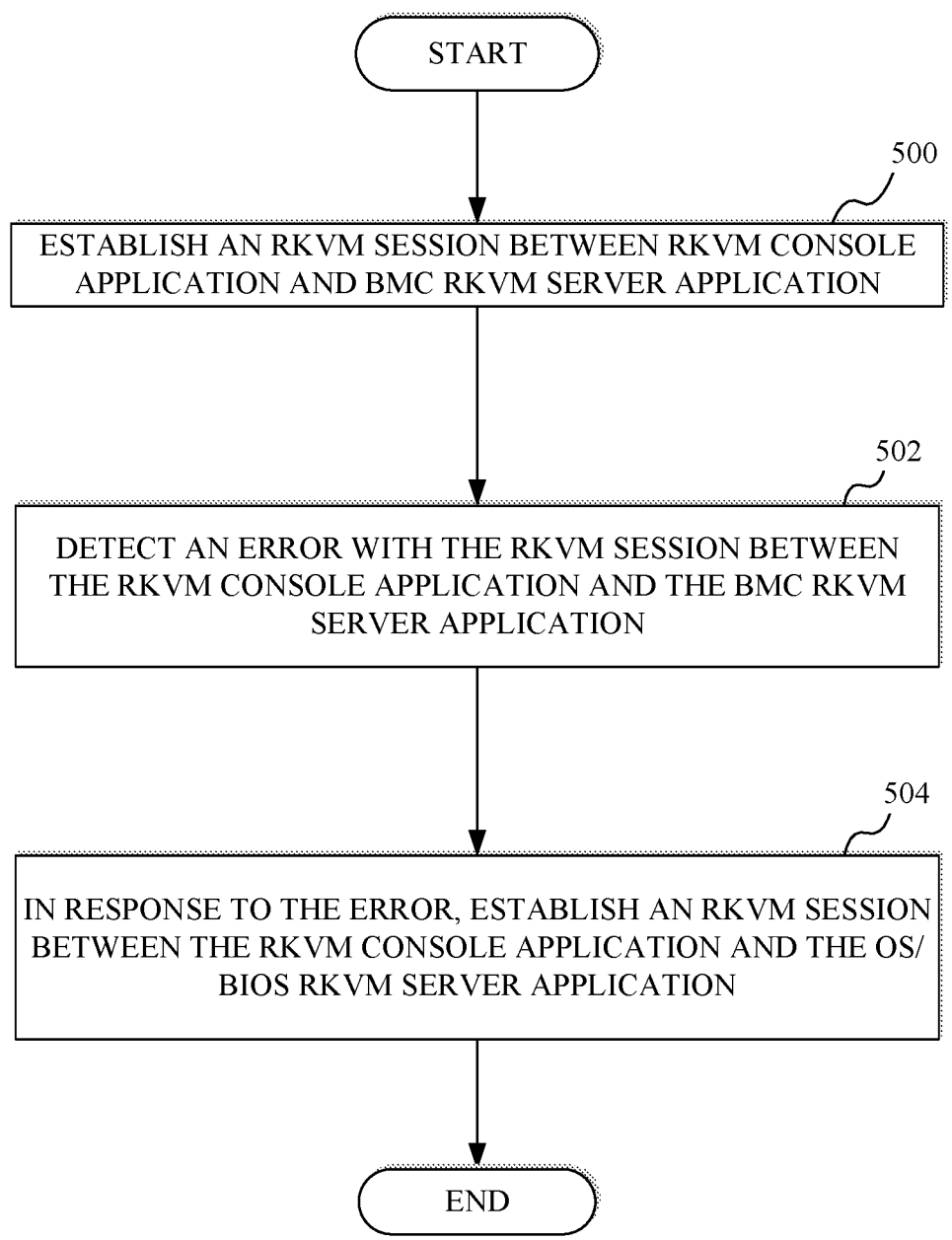

REMOTE KEYBOARD-VIDEO-MOUSE TECHNOLOGIES

TECHNICAL FIELD

The present technology pertains to remote keyboard, video, and mouse session protocols and mechanisms.

BACKGROUND

Remote administration software is being used with increasing popularity by users to control or administer servers remotely. Indeed, modern servers generally include a remote keyboard, video, and mouse (rKVM) feature which allows a user to connect to the server remotely from another device and control the server. Through the rKVM feature, the user can view the server's screen and access server components, such as a keyboard and mouse. The rKVM feature is typically operated via a baseboard management controller (BMC) on the server. Thus, the reliability and stability of the rKVM session largely depends on the BMC and the rKVM network connection. If the BMC or rKVM network connection encounters a problem, the rKVM session can become unstable. In many cases, the rKVM session can be prematurely terminated when the BMC or rKVM network connection encounters a problem. And if the problem persists, the user can even be prevented from re-establishing an rKVM session. This can greatly inconvenience the user, particularly when physical access to the server is difficult or impractical.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are technologies for remote keyboard-video-mouse session failover. In some embodiments, a system can establish a first remote keyboard-video-mouse session between a console application on the system and a first server application executed by a controller, such as a baseboard management controller (BMC), on a server. The first remote keyboard-video-mouse session can be established via a first network connection between the system and the controller on the server. For example, the controller can have its own communications interface to communicate with the system over a network. The communications interface can be different than other communications interface(s) used by the server to establish network connections.

Next, the system can detect an error associated with the first remote keyboard-video-mouse session. For example, the system can send periodic commands to the controller, and/or associated server application, requesting a response from the controller. The command can be a request for a network address associated with another component of the server, such as the operating system (OS) or the server's BIOS. If the system does not receive a response within a threshold period of time or a threshold number of attempts, it can determine that an error has occurred with the first remote keyboard-video-mouse session and/or the associated connection between the system and the controller.

In response to the error, the system can establish a second remote keyboard-video-mouse session between the console application and a second server application executed by an operating or a basic input/output program on the server. The second remote keyboard-video-mouse session can be established via a second network connection between the system and the second server application. The second server application can be executed or managed by the OS or BIOS of the server, as opposed to the controller. Moreover, the second server application can establish the connection with the console application via a different communications interface than the first server application. This way, the second server application can continue to function and communication with the console application even if the controller, the first server application, and/or the communications interface associated with the controller experience an error or failure.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 illustrates a schematic diagram of an example communications flow remote keyboard, video, and mouse service failover; and FIG. 5 illustrates an example method for remote keyboard, video, and mouse service failover.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Disclosed are systems, methods, and non-transitory computer-readable storage media for flexible and reliable remote administration applications. A brief introductory description of example systems and configurations for remote keyboard-video-mouse are first disclosed herein. A detailed description of remote keyboard-video-mouse, including examples and variations, will then follow. These variations shall be described herein as the various embodiments are set forth. The disclosure first turns to FIGS. 1A and 1B.

As used herein, the term remote keyboard, video, mouse (rKVM) refers to any software, protocol, interface, firmware, and/or hardware for remote administration, such as remote desktop software, which can be used to remotely access or control, over a network and from a first device, a second device's keyboard, video (i.e., screen or video console display), and mouse, as well as any other component, such as storage devices or images, memory devices, peripheral components, etc. Moreover, rKVM can be implemented using one or more protocols, such as remote desktop protocol (RDP), remote framebuffer (RFB), independent computing architecture (ICA), secure shell (SSH), telnet, HTTP (hypertext transfer protocol), and/or their successors or equivalents, including proprietary protocols for remotely accessing or controlling a device's keyboard, video, and mouse.

As used herein, the terms "BIOS" and "basic input/output system" can refer to any firmware used to initialize a system's hardware components, test the system's hardware components, load a boot loader from a memory device, load an operating system from a memory device, and so forth. For example, as used herein, the term BIOS and basic input/output system can refer to firmware known in the art as Basic Input/Output System or its successors or equivalents, such as an Extensible Firmware Interface (EFI) or Unified Extensible Firmware Interface (UEFI).

Figure 1A:
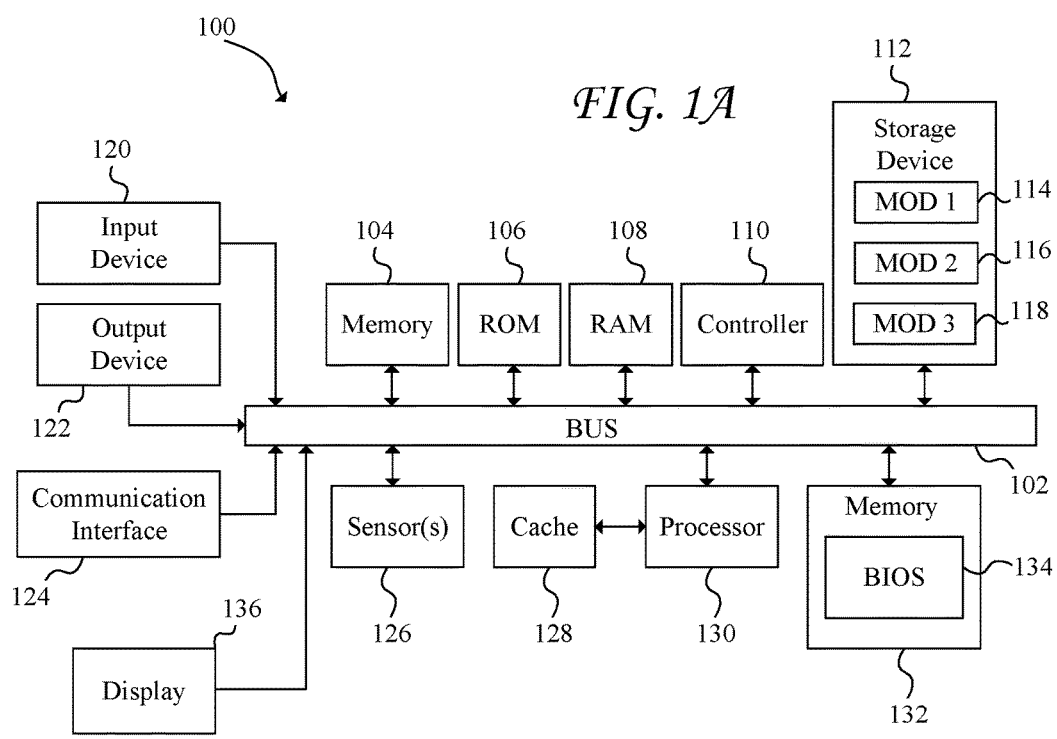
FIGS. 1A-B illustrate example system embodiments.
Figure 1B:
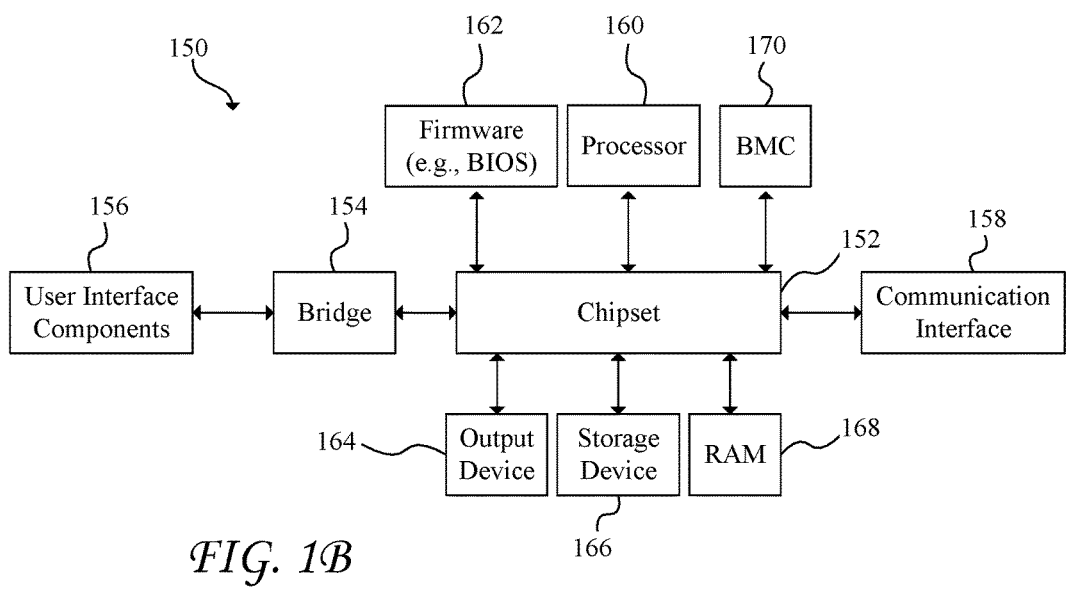

FIGS. 1A and 1B illustrate example system embodiments. The more appropriate embodiment will be apparent to those of ordinary skill in the art when practicing the present technology. Persons of ordinary skill in the art will also readily appreciate that other system embodiments are possible.

FIG. 1A illustrates a system bus computing system architecture 100 wherein the components of the system are in electrical communication with each other using a bus 102. Example system 100 includes a processing unit (CPU or processor) 130 and a system bus 102 that couples various system components including the system memory 104, such as read only memory (ROM) 106 and random access memory (RAM) 108, to the processor 130. The system 100 can include a cache of high-speed memory connected directly with, in close proximity to, or integrated as part of the processor 130. The system 100 can copy data from the memory 104 and/or the storage device 112 to the cache 128 for quick access by the processor 130. In this way, the cache can provide a performance boost that avoids processor 130 delays while waiting for data. These and other modules can control or be configured to control the processor 130 to perform various actions. Other system memory 104 may be available for use as well. The memory 104 can include multiple different types of memory with different performance characteristics. The processor 130 can include any general purpose processor and a hardware module or software module, such as module 1 114, module 2 116, and module 3 118 stored in storage device 112, configured to control the processor 130 as well as a special-purpose processor where software instructions are incorporated into the actual processor design. The processor 130 may essentially be a completely self-contained computing system, containing multiple cores or processors, a bus, memory controller, cache, etc. A multi-core processor may be symmetric or asymmetric.

To enable user interaction with the computing device 100, an input device 120 can represent any number of input mechanisms, such as a microphone for speech, a touch-sensitive screen for gesture or graphical input, keyboard, mouse, motion input, speech and so forth. An output device 122 can also be one or more of a number of output mechanisms known to those of skill in the art. In some instances, multimodal systems can enable a user to provide multiple types of input to communicate with the computing device 100. The communications interface 124 can generally govern and manage the user input and system output. There is no restriction on operating on any particular hardware arrangement and therefore the basic features here may easily be substituted for improved hardware or firmware arrangements as they are developed.

Storage device 112 is a non-volatile memory, such as an NVMe drive, and can be a hard disk or other types of computer readable media which can store data that are accessible by a computer, such as magnetic cassettes, flash memory cards, solid state memory devices, digital versatile disks, cartridges, random access memories (RAMS) 108, read only memory (ROM) 106, and hybrids thereof.

The storage device 112 can include software modules 114, 116, 118 for controlling the processor 130. Other hardware or software modules are contemplated. The storage device 112 can be connected to the system bus 102. In one aspect, a hardware module that performs a particular function can include the software component stored in a computer-readable medium in connection with the necessary hardware components, such as the processor 130, bus 102, display 136, and so forth, to carry out the function.

The controller 110 can be a specialized microcontroller or processor on the system 100, such as a BMC (baseboard management controller). In some cases, the controller 110 can be part of an Intelligent Platform Management Interface (IPMI). Moreover, in some cases, the controller 110 can be embedded on a motherboard or main circuit board of the system 100. The controller 110 can manage the interface between system management software and platform hardware. The controller 110 can also communicate with various system devices and components (internal and/or external), such as controllers or peripheral components, as further described below.

The controller 110 can generate specific responses to notifications, alerts, and/or events and communicate with remote devices or components (e.g., electronic mail message, network message, etc.), generate an instruction or command for automatic hardware recovery procedures, etc. An administrator can also remotely communicate with the controller 110 to initiate or conduct specific hardware recovery procedures or operations, as further described below.

Different types of sensors (e.g., sensors 126) on the system 100 can report to the controller 110 on parameters such as cooling fan speeds, power status, operating system (OS) status, hardware status, and so forth. The controller 110 can also include a system event log controller and/or storage for managing and maintaining events, alerts, and notifications received by the controller 110. For example, the controller 110 or a system event log controller can receive alerts or notifications from one or more devices and components and maintain the alerts or notifications in a system even log storage component.

Flash memory 132 can be an electronic non-volatile computer storage medium or chip which can be used by the system 100 for storage and/or data transfer. The flash memory 132 can be electrically erased and/or reprogrammed. Flash memory 132 can include erasable programmable read-only memory (EPROM), electrically erasable programmable read-only memory (EEPROM), ROM, NVRAM, or complementary metal-oxide semiconductor (CMOS), for example. The flash memory 132 can store the basic input/output system (BIOS) firmware 134 executed by the system 100 when the system 100 is first powered on, along with a set of configurations specified for the BIOS 134. The flash memory 132 can also store configurations used by the BIOS 134.

The BIOS 134 can be loaded and executed as a sequence program each time the system 100 is started. The BIOS 134 can recognize, initialize, and test hardware present in the system 100 based on the set of configurations. The BIOS 134 can perform a self-test, such as a Power-on-Self-Test (POST), on the system 100. This self-test can test functionality of various hardware components such as hard disk drives, optical reading devices, cooling devices, memory modules, expansion cards and the like. The BIOS 134 can address and allocate an area in the memory 104, ROM 106, RAM 108, and/or storage device 112, to store an operating system (OS). The BIOS 134 can load a boot loader and/or OS, and give control of the system 100 to the OS.

The BIOS 134 of the system 100 can include a firmware configuration that defines how the BIOS 134 controls various hardware components in the system 100. The firmware configuration can determine the order in which the various hardware components in the system 100 are started. The BIOS 134 can provide an interface, such as an UEFI, that allows a variety of different parameters to be set, which can be different from parameters in a firmware default configuration. For example, a user (e.g., an administrator) can use the BIOS 134 to specify clock and bus speeds, define what peripherals are attached to the system 100, set monitoring of health (e.g., fan speeds and CPU temperature limits), and/or provide a variety of other parameters that affect overall performance and power usage of the system 100.

While BIOS 134 is illustrated as being stored in the flash memory 132, one of ordinary skill in the art will readily recognize that the BIOS 134 can be stored in other memory components, such as memory 104 or ROM 106, for example. However, BIOS 134 is illustrated as being stored in the flash memory 132 as a non-limiting example for explanation purposes.

System 100 can include one or more sensors 126. The one or more sensors 126 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 126 can communicate with the processor, cache 128, flash memory 132, communications interface 124, memory 104, ROM 106, RAM 108, controller 110, and storage device 112, via the bus 102, for example.

The various components in system 100 (e.g., sensors 126, processor 130, controller 110, storage device 112, etc.) can also communicate with other components in the system 100 via one or more different means, such as an inter-integrated circuit (I2C) bus, SMBus (system management bus), eSPI (enhanced serial peripheral interface), LPC (low pin count), a general purpose input/output (GPIO) interface, a peripheral component interconnect express (PCIe) interface, and the like.

FIG. 1B illustrates an example computer system 150 having a chipset architecture that can be used in executing the described method(s) or operations, and generating and displaying a graphical user interface (GUI). Computer system 150 can include computer hardware, software, and firmware that can be used to implement the disclosed technology. System 150 can include a processor 160, representative of any number of physically and/or logically distinct resources capable of executing software, firmware, and hardware configured to perform identified computations. Processor 160 can communicate with a chipset 152 that can control input to and output from processor 160. In this example, chipset 152 outputs information to output 164, such as a display, and can read and write information to storage device 166, which can include magnetic media, solid state or non-volatile media (e.g., NVMe), for example. Chipset 152 can also read data from and write data to RAM 168. A bridge 154 for interfacing with a variety of user interface components 156 can be provided for interfacing with chipset 152. Such user interface components 156 can include a keyboard, a microphone, touch detection and processing circuitry, a pointing device, such as a mouse, and so on. In general, inputs to system 150 can come from any of a variety of sources, machine generated and/or human generated.

Chipset 152 can also interface with one or more communication interfaces 158 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 160 analyzing data stored in storage 166 or 168. Further, the machine can receive inputs from a user via user interface components 156 and execute appropriate functions, such as browsing functions by interpreting these inputs using processor 160.

Moreover, chipset 152 can also communicate with firmware 162, which can be executed by the computer system 150 when powering on. The firmware 162 can recognize, initialize, and test hardware present in the computer system 150 based on a set of firmware configurations. The firmware 162 can perform a self-test, such as a POST, on the system 150. The self-test can test functionality of the various hardware components 152-168. The firmware 162 can address and allocate an area in the memory 168 to store an OS. The firmware 162 can load a boot loader and/or OS, and give control of the system 150 to the OS. In some cases, the firmware 162 can communicate with the hardware components 152-160 and 164-168. Here, the firmware 162 can communicate with the hardware components 152-160 and 164-168 through the chipset 152 and/or through one or more other components. In some cases, the firmware 162 can communicate directly with the hardware components 152-160 and 164-168.

Further, chipset 152 can communicate with BMC 170. BMC 170 can be a specialized processor or controller that can perform management, monitoring, and control operations, similar to controller 110 as previously described with reference to FIG. 1A. For example, BMC 170 can monitor system 150 and any of its components, generate logs, send control signals to one or more specific components, and/or communicate with other devices, components, or administrators via a network connection, which can be an independent network connection.

It can be appreciated that example systems 100 and 150 can have more than one processor (e.g., 130, 160) or be part of a group or cluster of computing devices networked together to provide greater processing capability.

Figure 2:
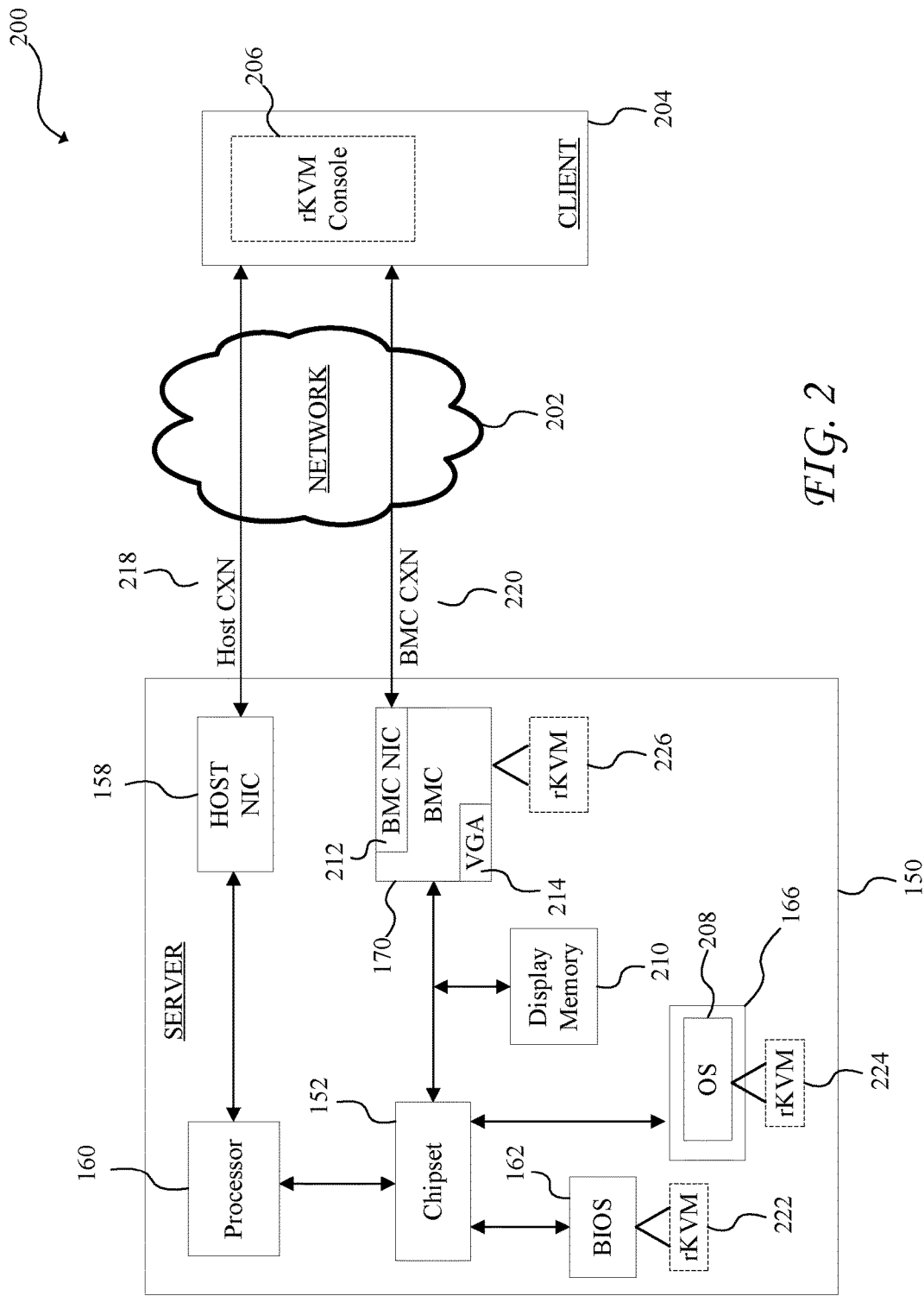
FIG. 2 illustrates a schematic diagram of a system for remote keyboard, video, and mouse services.

FIG. 2 illustrates a schematic diagram of a system 200 for remote keyboard, video, mouse (rKVM). System 204 can establish an rKVM session with system 150 over network 202. Network 202 can include one or more networks. Moreover, network 202 can include a public network, such as the Internet; a private network, such as a local area network (LAN); and/or a combination, such as a virtual private network (VPN).

System 204 can be any computing device with network connectivity, such as a desktop computer, a laptop computer, a tablet computer, a smartphone, etc. System 204 can include an rKVM console application 206 for rKVM, which can be used to establish rKVM sessions with rKVM server applications 222-226 on system 150.

System 150 can include a communications interface 158 for establishing and maintaining network connections over network 202. System 150 can also include processor 160 and BMC 170 for executing various instructions and controlling various components, operations, and communications. System 150 can also include an operating system (OS) 208, which can be stored in a storage device on the system 150, such as storage 166. The OS 208 can manage the system's hardware and software resources and provide services to computer programs. Moreover, the OS 208 can use communications interface 158 to connect with other devices over network 202. The OS 208 can use a specific network address (e.g., Internet Protocol address) assigned to the OS 208 to communicate over network 202.

The BIOS 162 can also use communications interface 158 to communicate over network 202. The BIOS 162 can use a specific network address assigned to the BIOS 162 to communicate over network 202. The network address assigned to the BIOS 162 can be different than the network address assigned to the OS 208. However, in some cases, the BIOS 162 may not send or receive network communications while the OS 208 is loaded and running. Accordingly, in some cases, the BIOS 162 may have assigned the same network address as the OS 208 without creating an addressing conflict.

The BMC 170 can include a video component 214, such as a video graphics array (VGA), for video. The video component 214 can include specific hardware and/or software for video. The BMC 170 can also include a communications interface 212 for establishing network connections over the network 202. The communications interface 212 on the BMC 170 can use a network address assigned to the communications interface 212 to allow the BMC 170 to communicate over the network 202. The network address assigned to the communications interface 212 (and therefore BMC 170) can be different than the network address assigned to the BIOS 162 and the OS 208. Thus, in some examples, the system 150 can have different network addresses for the BIOS 162, the OS 208, and the BMC 170.

The system 150 can include display memory 210 which can include memory allocated toward video usage. The display memory 210 can include a hardware memory component, such as a RAM, and/or virtual memory, such as a logical file or disk. The system 150 can also include a chipset 152, which can manage the data flow between the processor 160, storage device 166, BIOS 162, BMC 170, display memory 210, and any other components. The chipset 152 can enable in-band connections with the various components.

The system 150 can include an rKVM server application 224 hosted by the operating system 208, an rKVM server application 222 hosted by the BIOS 162, and/or an rKVM server application 226 hosted by the BMC 170. The rKVM server application 222-226 can be used to establish and maintain an rKVM session with the rKVM console application 206 on system 204.

The rKVM server application 226 on the BMC 170 can use the communications interface 212 on the BMC 170 to establish a BMC connection 220 over network 202 with the rKVM console application 206 on the system 204. Moreover, the rKVM server application 224 on the BIOS 162 and the rKVM server application 226 on the OS can use the communications interface 158 on the system 150 to establish a host connection 218 over network 202 with the rKVM console application 206 on the system 204. The host connection 218 and BMC connection 220 can be used for rKVM sessions over network 202 with the rKVM console application 206 on the system 204.

Moreover, the host connection 218 and BMC connection 220 can use different network addresses to communicate with the rKVM console application 206 and system 204 over network 202. For example, the BMC connection 220 can be based on a network address assigned to the BMC 170, while the host connection 218 can be based on one or more different network addresses assigned to the OS 208 and/or the BIOS 162.

The rKVM server applications 222-226 can be used to provide rKVM session failover. For example, the rKVM console application 206 can establish an rKVM session with rKVM server application 226 via BMC connection 220. The rKVM console application 206 can send periodically a command to the BMC 170 requesting the network address of the BIOS 162 and/or the OS 208. The rKVM console application 206 can periodically receive the network address of the BIOS 162 and/or the OS 208 from the BMC 170. The rKVM console application 206 can then use the network address of the BIOS 162 and/or the OS 208 to continue the rKVM session, or establish a new rKVM session, over host connection 218 if the rKVM console application 206 detects an error or failure with the current rKVM session with rKVM server application 226 over the BMC connection 220.

The rKVM console application 206 can detect the error or failure based on an event, such as a packet loss, a connection degradation, a user input, a determination that the rKVM server application 226 is unresponsive, or any other factor. For example, the rKVM console application 206 can detect a problem if it fails to receive one or more responses from the rKVM server application 226 over a period of time. To illustrate, as previously mentioned, the rKVM console application 206 can periodically send commands to the rKVM server application 226 requesting the network address of the BIOS 162 and/or the OS 208. Thus, the rKVM console application 206 can detect a failure if it fails to receive a response from rKVM server application 226 within a period of time, a specific number of responses rKVM server application 226 within a period of time, and/or if a latency of responses increases above a threshold.

When the rKVM console application 206 detects the failure, it can trigger a connection with rKVM server application 222 or 224 over the host connection 218. Thus, the rKVM console application 206 can connect over the host connection 220 with rKVM server application 222 or 224 to continue or re-establish the rKVM session with system 150. This way, the rKVM console application 206 can continue or maintain the rKVM session with system 150 even if the BMC 170, the rKVM server application 226, the communications interface 212, and/or the BMC connection 220 experience a problem or failure, which may otherwise affect the rKVM session between the rKVM console application 206 and the rKVM server application 226.

During the rKVM session with the rKVM server application 222 or 224 over the host connection 218, the rKVM console application 206 can periodically send commands to the rKVM server application 222 or 224 requesting the network address of the BMC 170 and rKVM server application 226. The rKVM console application 206 can, therefore, periodically receive responses from the rKVM server application 222 or 224, identifying the network address of the BMC 170 and rKVM server application 226. The rKVM console application 206 can monitor the responses in order to detect any failures or errors as previously described. If the rKVM console application 206 detects an error or failure, it can connect again to the rKVM server application 226 over the BMC connection 220 in order to continue or re-establish the rKVM session with system 150. This way, the rKVM console application 206 can maintain an rKVM session with the system 150 even if the host connection 218 (e.g., BIOS 162, OS 208, communications interface 158, etc.) experiences a problem.

The BMC 170, BIOS 162, and OS 208 can exchange their respective network addresses with each other, so each can provide the others' network addresses to the rKVM console application 206 in response to the requests or commands received from the rKVM console application 206. For example, the BMC 170, BIOS 162, and OS 208 can exchange their respective network addresses with each other through in-band connections. If the BMC 170 receives a request from the rKVM console application 206 for the network address of the BIOS 162 and/or the OS 208, the BMC 170 can respond with the network address or addresses received from the BIOS 162 and/or OS 208 via the in-band connections.

The BMC 170, BIOS 162, and OS 208 can exchange their respective network addresses with each other using their respective rKVM server applications 222-226. For example, each of the rKVM server applications 222-226 can be configured to report its network address to the other rKVM server applications 222-226. In some examples, the BIOS 162 and OS 208 can each include a program designed to respectively report the network addresses of the BIOS 162 and OS 208 to the BMC 170, and obtain the BMC's network address from the BMC 170. These programs can be standalone programs or incorporated in the rKVM server applications 222 and 224. Moreover, these programs can communicate via in-band connections, such as LPC, SMBus, I2C, eSPI, PCIe, and so forth.

Figure 3A:
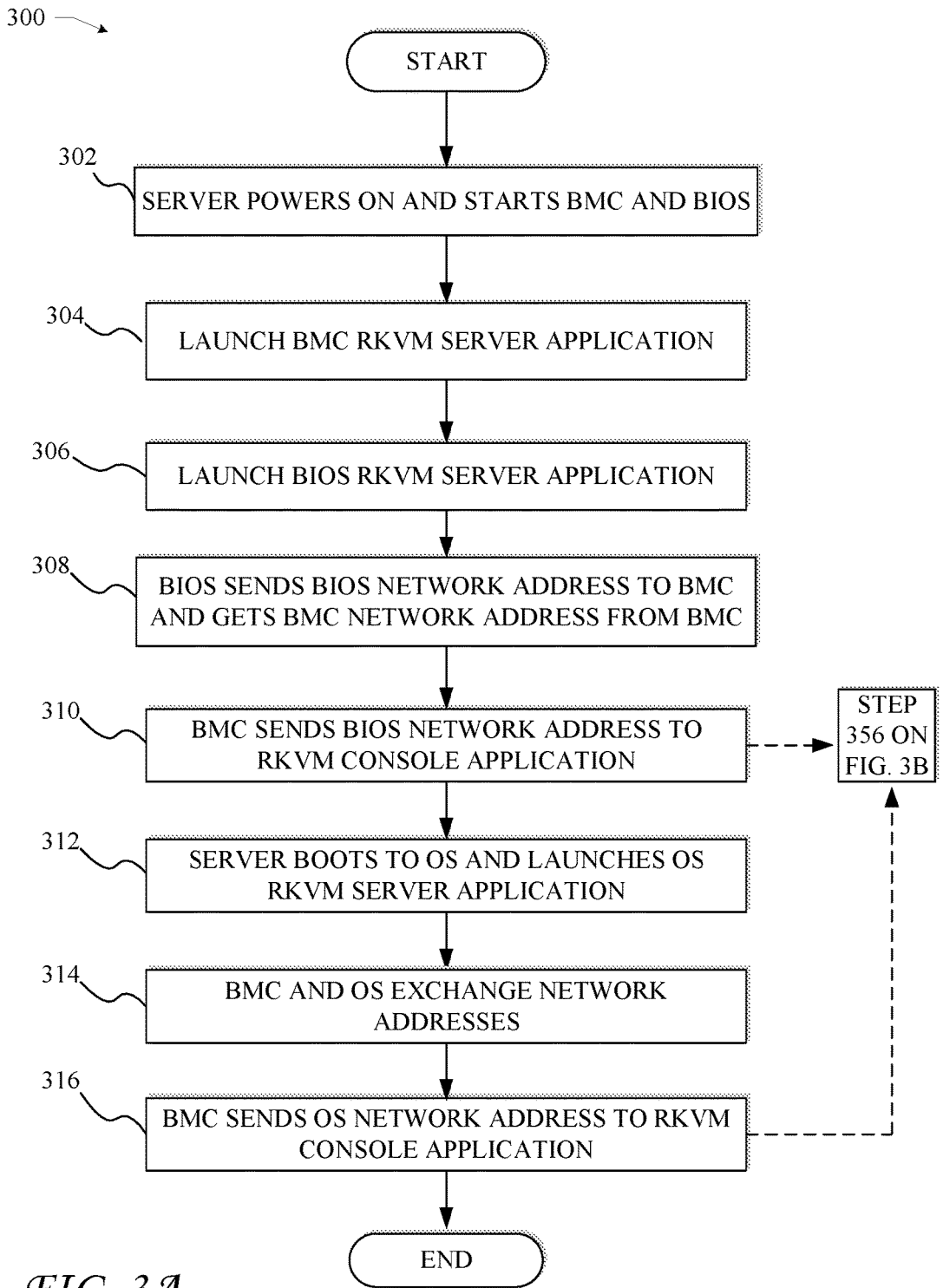
FIG. 3A illustrates a schematic diagram of an example server-side process for remote keyboard, video, and mouse services.

FIG. 3A illustrates a schematic diagram of an example server-side process 300 for rKVM services. At step 302, server system 150 powers on and starts the BMC 170 and BIOS 162. At step 304, the BMC 170 launches its rKVM server application 226 and, at step 306, the BIOS 162 launches its rKVM server application 222.

At step 308, the BIOS 162 sends its network address (e.g., IP address) to the BMC 170, and gets the BMC's network address from the BMC 170. The BIOS 162 can communicate with the BMC 170 via an in-band connection and command.

At step 310, the BMC 170 sends the network address of the BIOS 162 to the rKVM console application 206 at the remote system 204. The BMC 170 can send the BIOS' network address in response to a command or request received from the rKVM console application 206. For example, the BMC 170 can receive a command from the rKVM console application 206 requesting the BIOS' network address, and respond at step 310 with a message to rKVM console application 206 that includes the BIOS' network address.

In some cases, step 310 can be performed multiple times. For example, the BMC 170 can send the network address of the BIOS 162 to the rKVM console application 206 periodically. The BMC 170 can also periodically receive commands or requests from the rKVM console application 206 which can trigger the BMC 170 to periodically send the network address of the BIOS 162 to the rKVM console application 206.

At step 312, the server system 150 can boot to the OS 208 and launch the rKVM server application 224 from the OS 208. At step 314, the BMC 170 and OS 208 can exchange network addresses. For example, the OS 208 can run a program that requests the network address from the BMC 170 and reports the network address of the OS 208 to the BMC 170. The program can be a standalone program or it can be part of the rKVM server application 224 hosted by the OS 208.

At step 316, the BMC 170 can send the network address of the OS 208 to the rKVM console application 206. The BMC 170 can send the network address of the OS 208 to the rKVM console application 206 in response to a command or request from the rKVM console application 206. Moreover, the BMC 170 can send the network address of the OS 208 at different times. For example, the BMC 170 can periodically send the network address of the OS 208 in response to periodic commands or requests from the rKVM console application 206.

Figure 3B:
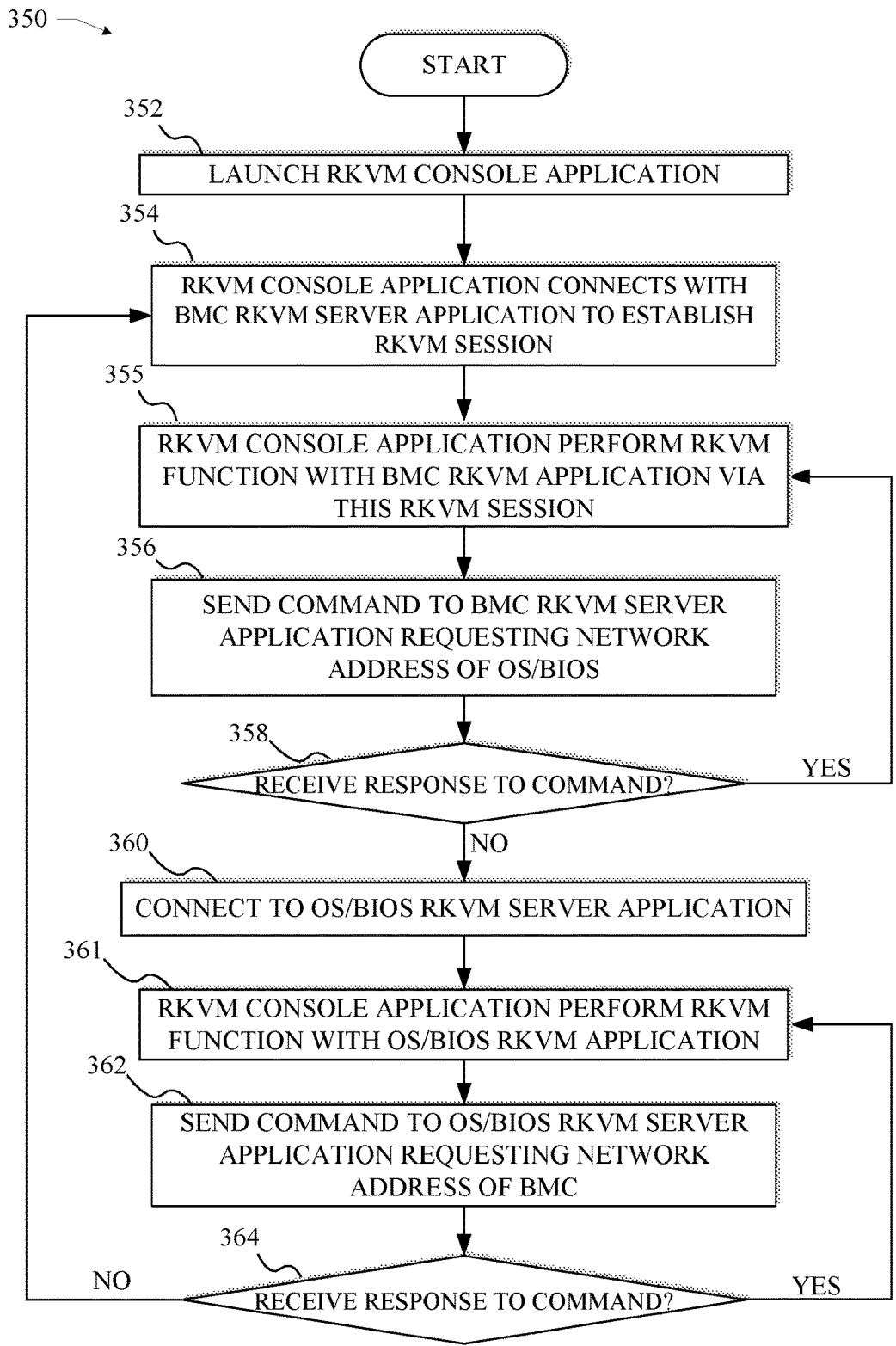
FIG. 3B illustrates a schematic diagram of an example client-side process for remote keyboard, video, and mouse services.

FIG. 3B illustrates a schematic diagram of an example client-side process 350 for rKVM services. At step 352, the system 204 can launch the rKVM console application 206. At step 354, the rKVM console application 206 can connect with the BMC's rKVM server application 226 to establish an rKVM session. The rKVM console application 206 can connect with the rKVM server application via BMC connection 220 using the network address of the BMC 170.

At step 355, the rKVM console application 206 can perform an rKVM function with the BMC rKVM server application 226 via the current rKVM session. The rKVM function can be a command used by the rKVM console application 206 to query the BMC rKVM server application 226 and/or verify the status of the session (e.g., active and working, inactive, etc.) or the data of display memory.

At step 356, the rKVM console application 206 can send a command to the BMC 170, requesting the network address of the BIOS 162 and/or the OS 208. The rKVM console application 206 can send the command multiple times. For example, the rKVM console application 206 can send the command periodically based on an interval or event.

At step 358, the rKVM console application 206 can determine if it received a response to the command from the BMC 170. If the rKVM console application 206 received a response, the process 350 returns to step 355, where the rKVM console application 206 can continue the rKVM session with the rKVM server application 226. If the rKVM console application 206 does not receive a response, at step 360, the rKVM console application 206 connects to rKVM server application 222 or 224. The rKVM console application 206 can connect to rKVM server application 222 or 224 using the network address information received from the BMC 170 at step 356.

By connecting to rKVM server application 222 or 224, rKVM console application 206 can continue or re-establish the rKVM session through the host connection 218. Thus, if rKVM console application 206 detects a problem connecting to rKVM server application 226 via BMC connection 220, it can continue the rKVM session with server system 150 through the host connection 218 and limit any disruption.

At step 361, the rKVM console application 206 can perform an rKVM function with the OS/BIOS rKVM server application 222 or 224 via the current rKVM session. Again, the rKVM function can be a command used by the rKVM console application 206 to query the rKVM server application 222 and/or 224, and/or verify the status of the session (e.g., active and working, inactive, etc.) or the data of display memory.

At step 362, the rKVM console application 206 can send a command to the OS 208 and/or the BIOS 162, requesting the network address of the BMC 170. The rKVM console application 206 can send this command periodically, for example, based on an interval or event.

At step 364, the rKVM console application 206 determines if it received a response to the command from step 361 or 362. If the rKVM console application 206 determines that it did receive a response, it returns to step 361, where it remains connected to the rKVM server application 222 or 224. On the other hand, if the rKVM console application 206 determines that it did not receive a response within a threshold period of time, it returns to step 354, where it can connect with rKVM server application 226 to continue or re-establish an rKVM session over the BMC connection 220.

FIG. 4 illustrates a schematic diagram of an example communications flow 400 for rKVM failover. At message 402, the BIOS 162 first sends the BIOS network address to the BMC 170. At message 404, the BMC 170 sends the BMC network address to the BIOS 162.

At message 406, the rKVM console application 206 establishes an rKVM connection with the BMC 170 (i.e., rKVM server application 226). At message 408, the rKVM console application 206 sends a command to the BMC 170 requesting the BIOS network address.

At message 410, the BMC 170 sends the BIOS network address to the rKVM console application 206. After OS 208 boots, at message 412, the OS 208 sends the OS network address to the BMC 170. At message 414, the BMC 170 sends the BMC network address to the OS 208.

At message 416, console 206 sends a command to the BMC 170 requesting the OS network address. At message 418, the BMC 170 sends the OS network address to the console 206.

At message 420, console 206 sends another command to the BMC 170 requesting the OS network address and/or the BIOS network address, or performing rKVM function. At message 422, the BMC 170 is unable to send the OS network address or the BIOS network address, or is unable to response rKVM commands to the console 206. The console 206 can determine that it did not receive a response to message 420, which included the command, and subsequently send message 424 to the OS 208 to connect to the OS 208 and rKVM server application 224.

At message 426, the console 206 sends a command to the OS 208 requesting the BMC network address. At message 428, the OS 208 can send the BMC network address to the console 206.

At message 430, the console 206 sends another command to the OS 208, requesting the BMC network address. If the console 206 does not receive a response from the OS 208, it can then use the BMC network address to connect to the BMC 170. The console 206 can then periodically continue to send commands and listen for responses. If the console 206 does not receive one or more responses, it can again connect to the OS 208 or the BIOS 162.

FIG. 5 illustrates an example method embodiment for rKVM failover. At step 500, the console application 206 establishes an rKVM session between the rKVM console application 206 and rKVM server application 226. The rKVM session can be established via BMC connection 220 between the BMC 170 and the client 204.

At step 502, the rKVM console application 206 can detect an error with the rKVM session between the rKVM console application 206 and the rKVM server application 226. For example, the rKVM console application 206 can send one or more commands to the rKVM server application 226 and listen for one or more responses from the rKVM server application 226. The one or more commands can include requests to trigger the rKVM server application 226 to send the BIOS and/or OS network address to the rKVM console application 206. If the rKVM console application 206 does not receive a response, it can determine that an error has occurred. The determination of the error can be triggered by failing to receive one or more responses within a period of time, receiving less responses than expected, receiving responses with a threshold latency, and so forth.

At step 504, in response to the error, the rKVM console application 206 can establish an rKVM session between the rKVM console application 206 and the rKVM server application 222 or 224. For example, the rKVM console application 206 can establish an rKVM session with rKVM server application 222 or 224 if the rKVM server application 226 is not available, and vice versa. The rKVM session can be a continuation or extension of the earlier rKVM session, a new rKVM session, or the earlier rKVM session re-established with the rKVM server application 226, 222 or 224.

The rKVM console application 206 can continue to send messages to, and listen for responses from, whichever rKVM server application 222-226 it is currently connected to in an rKVM session. If the rKVM console application 206 fails to receive a threshold number of responses, it can then connect with another rKVM server application to maintain or re-establish the rKVM session.

When connecting to the rKVM server application 222 or 224, the rKVM console application 206 can connect to a different network address and/or communications interface than it did when connecting to the rKVM server application 226. This way, the rKVM console application 206 can maintain failover paths and connections for the rKVM session.

On the server side, the BIOS 162, BMC 170, and OS 208 can communicate via in-band connections to exchange respective network address information. For example, the BMC 170 can connect to BIOS 162 and OS 208 to exchange network address information. The BMC 170 can thus maintain the network address information for BIOS 162 and OS 208; the BIOS 162 can maintain the network address information for the BMC 170; and the OS 208 can maintain the network address information for the BMC 170. Accordingly, the BIOS 162, BMC 170, and OS 208 can report each other's network address to the rKVM console application 206.

For clarity of explanation, the present technology has been described with respect to peripheral component interconnect express devices. However, the methods and concepts according to the above-described examples can be implemented for hardware recovery of other types of devices. Indeed, the concepts described herein can be implemented for hardware recovery, including hot-add and hot-remove, of any device with hot-plug or hot-swap support, such as universal serial bus (USB) devices. Again, peripheral component interconnect express devices are used herein as non-limiting examples for the sake of clarity and explanation purposes.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The term "a" or "an" entity refers to one or more of that entity. As such, the terms "a" (or "an"), "one or more" and "at least one" can be used interchangeably herein. The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Moreover, claim language reciting "at least one of" a set indicates that one member of the set or multiple members of the set satisfy the claim. For example, claim language reciting "at least one of A, B, and C" or "at least one of A, B, or C" means A alone, B alone, C alone, A and B together, A and C together, B and C together, or A, B and C together.

The term "in communication with" as used herein refers to any coupling, connection, or interaction using light and/or electrical signals to exchange information or data, using any system, hardware, software, protocol, or format.

The term "computer-readable storage medium", "computer-readable medium", computer-readable storage device", or computer-readable memory device", as used herein refer to any tangible storage which can participate in providing instructions to a processor for execution. Such a medium or device may take many forms, including but not limited to, non-volatile media, volatile media, and so forth. Non-volatile media can include, for example, NVRAM, SSD, NVMe, magnetic or optical disks, and the like. Volatile media can include, for example, dynamic memory, such as main memory.

Some forms of computer-readable media or device can include, for example, a floppy disk, flexible disk, hard disk, memory, magnetic tape, or any other magnetic medium, magneto-optical medium, CD-ROM, DVD, any other optical medium, punch cards, paper tape, any other physical medium with patterns of holes, RAM, PROM, EPROM, EEPROM, FLASH-EPROM, solid state medium like a memory card, any other memory chip or cartridge, or any other medium from which a computer can read. When the computer-readable media or device is configured as a database, it is to be understood that the database may be any type of database, such as relational, hierarchical, object-oriented, and/or the like. Accordingly, the disclosed technologies can be considered to include a tangible storage medium or device, and any recognized equivalents and successor media or device, in which the software implementations of the present invention are stored.

What is claimed is:

1. A non-transitory computer-readable storage device having stored therein instructions which, when executed by a processor, cause the processor to perform operations comprising:
    launching a first keyboard-video-mouse application on a controller of a server;
    launching a second keyboard-video-mouse application on a basic input/output system of the server;
    causing the basic input/output system to send a first network address of the basic input/output system to the controller, and get a second network address of the controller;
    causing the controller to send the first network address to a console application running at a computing device;
    rebooting the server;
    launching a third keyboard-video-mouse application on an operating system of the server;
    establishing a first remote keyboard-video-mouse session between the console application running at the computing device and the first keyboard-video-mouse application executed by the controller, wherein the first remote keyboard-video-mouse session is established via a first network connection between the computing device and the controller;
    detecting an error associated with the first remote keyboard-video-mouse session between the console application and the first keyboard-video-mouse application; and in response to the error, establishing a second remote keyboard-video-mouse session between the console application and the second keyboard-video-mouse application, or between the console application and the third keyboard-video-mouse application, wherein the second remote keyboard-video-mouse session is established via a second network connection between the computing device and the server.

2. The computer-readable storage device of claim 1, storing additional instructions which, when executed by the processor, cause the processor to perform operations comprising:

detecting a second error associated with the second remote keyboard-video-mouse session between the console application and the second keyboard-video-mouse application; and in response to the second error, re-establishing the first remote keyboard-video-mouse session between the console application and the first keyboard-video-mouse application, wherein the first remote keyboard-video-mouse session is re-established via the first network connection between the computing device and the controller.

3. The computer-readable storage device of claim 2, wherein detecting the second error comprises:

sending, to the second keyboard-video-mouse application, a request for a respective network address of the controller, or a request for performing a function of remote keyboard-video-mouse; and determining the second error when the console application fails to receive a response to the request for a respective network address or a response to the request for performing a function of remote keyboard-video-mouse from the second keyboard-video-mouse application within a predetermined period of time.

4. The computer-readable storage device of claim 2, wherein the first network connection between the computing device and the controller is established via a first network interface associated with the controller, and wherein the second network connection between the computing device and the server is established via a second network interface on the server.

5. The computer-readable storage device of claim 1, wherein detecting the error comprises:

sending, to the controller, a request for a network address assigned to one of the operating system running on the server or a basic input/output system program running on the server, or a request for performing a function of remote keyboard-video-mouse; and determining the error when the console application fails to receive a response to the request for a network address assigned to one of the operating system running on the server or a basic input/output system program running on the server or a response to the request for performing a function of remote keyboard-video-mouse from the controller within a predetermined period of time.

6. The computer-readable storage device of claim 5, wherein sending the request for a network address or a response to the request for performing a function of remote keyboard-video-mouse to the controller and determining the error comprises:

periodically sending the request for a network address or a response to the request for performing a function of remote keyboard-video-mouse to the controller during the first remote keyboard-video-mouse session; and periodically determining whether the response to the request for a network address or a response to the request for performing a function of remote keyboard-video-mouse is received by the console application.

7. The computer-readable storage device of claim 1, wherein the second network connection is based on the first network address or a third network address assigned to the operating system and wherein the first network connection is established based on the second network address.

8. A system comprising:

a processor;

one or more computer-readable storage media, the one or more computer-readable storage media storing an operating system and a basic input/output system progam; and a controller configured to:

receive, from the basic input/output system program, a first network address associated with the basic input/output system program;

send, to the basic input/output system program, a second network address associated with the controller;

establish a first remote keyboard-video-mouse session between a console application running at a remote device and a first server application executed by the controller, wherein the first remote keyboard-video-mouse session is established via a first network connection between the remote device and the controller;

perform a function of remote keyboard-video-mouse between the console application and the first server application executed by the controller;

detect an error associated with the first remote keyboard-video-mouse session between the console application and the first server application executed by the controller;

in response to the error, establish a second remote keyboard-video-mouse session between the console application and a second server application executed by one of the operating system or the basic input/output system program, wherein the second remote keyboard-video-mouse session is established via a second network connection between the remote device and the second server application;

send, to the remote device during the first remote keyboard-video-mouse session, the first network address associated with the basic input/output system program;

send, to the second server application, the second network address associated with the controller;

receive, from the second server application, a third network address associated with the operating system; and send, to the console application at the remote device, the third network address associated with the operating system.

9. The system of claim 8, wherein the controller receives the first network address from the basic input/output system program and sends the second network address to the basic input/output system program via a first in-band connection between the controller and the basic input/output system program.

10. A system of claim 9, wherein the controller sends the second network address to the second server application and receives the third network address from the second server application via a second in-band connection between the controller and the second server application.

11. The system of claim 8, wherein the console application detects the error associated with the first remote keyboard-video-mouse session between the console application and the first server application by:
- periodically sending, to the controller, a request for at least one of the first network address and the third network address, or a request for performing the function of remote keyboard-video-mouse; and
- determining the error when the console application fails to receive a response to the request for at least one of the first network address and the third network address, or a response to the request for performing the function of remote keyboard-video-mouse from the controller within a predetermined period of time.

12. The system of claim 8, the console application comprising additional computer-executable instructions to:
- detect a second error associated with the second remote keyboard-video-mouse session between the console application and the second server application; and
- in response to the second error, re-establishing the first remote keyboard-video-mouse session between the console application and the first server application, wherein the first remote keyboard-video-mouse session is re-established via the first network connection between the remote device and the controller.

13. The system of claim 8, wherein the second network connection is based on the first network address or a third network address assigned to the operating system, and wherein the network connection is established based on the second network address assigned to the controller.

14. A method comprising:
- launching a first keyboard-video-mouse application on a controller of a server;
- launching a second keyboard-video-mouse application on a basic input/output system of the server;
- causing the basic input/output system to send a first network address of the basic input/output system to the controller, and get a second network address of the controller;
- causing the controller to send the first network address to a console application running at a computing device;
- rebooting the server;
- launching a third keyboard-video-mouse application on an operating system of the server;
- establishing a first remote keyboard-video-mouse session between the console application running at the computing device and the first keyboard-video-mouse application executed by the controller, wherein the first remote keyboard-video-mouse session is established via a first network connection between the computing device and the controller;
- detecting an error associated with the first remote keyboard-video-mouse session between the console application and the first keyboard-video-mouse application; and
- in response to the error, establishing a second remote keyboard-video-mouse session between the console application and the second keyboard-video-mouse application, or between the console application and the third keyboard-video-mouse application, wherein the second remote keyboard-video-mouse session is established via a second network connection between the computing device and the server.

15. The method of claim 14, wherein the first network connection is established based on the second network address, and wherein the second network connection is based on the first network address or a third network address assigned to the operating system.

16. The method of claim 14, wherein detecting the error comprises:
- periodically sending, to the controller during the first remote keyboard-video-mouse session, a request for a network address assigned to one of the operating system or the basic input/output system program, or a request for performing a function of remote keyboard-video-mouse; and
- determining whether a response to the request for a network address assigned to one of the operating system or the basic input/output system program or a response to the request for performing a function of remote keyboard-video-mouse is received by the console application within a predetermined period of time.

17. The method of claim 14, further comprising:
- detecting a second error associated with the second remote keyboard-video-mouse session based on a failure to receive a response, from the second keyboard-video-mouse application, to a request for a network address of the controller, or to a request for performing a function of remote keyboard-video-mouse; and
- in response to the second error, re-establishing the first remote keyboard-video-mouse session between the console application and the first keyboard-video-mouse application, wherein the first remote keyboard-video-mouse session is re-established via the second network connection between the computing device and the server.

18. The method of claim 14, wherein the first network connection between the computing device and the controller is established via a first network interface associated with the controller, and wherein the second network connection between the computing device and the server is established via a second network interface on the server.

* * * * *